United States Patent [19]
Kanne

[11] Patent Number: 5,956,150
[45] Date of Patent: Sep. 21, 1999

[54] LASER MOUNT POSITIONING DEVICE AND METHOD OF USING SAME

[75] Inventor: Mark M. Kanne, Chandler, Ariz.

[73] Assignee: Motorola, Inc., Schaumburg, Ill.

[21] Appl. No.: 09/017,569

[22] Filed: Feb. 2, 1998

[51] Int. Cl.[6] .................................................. G01B 11/00
[52] U.S. Cl. ...................... 356/399; 250/227.24; 385/49
[58] Field of Search .................................. 356/399–401; 250/227.11–227.32; 385/49–52, 56, 59, 60, 71, 73, 74, 75, 76, 77, 88, 89, 90, 91, 92, 93, 94, 97–99

[56] References Cited

U.S. PATENT DOCUMENTS 4,803,361  2/1989  Aiki et al. .

*Primary Examiner*—K P Hantis
*Attorney, Agent, or Firm*—Frank J. Bogacz; Sherry J. Whitney

[57] ABSTRACT

The invention provides a simple, accurate, low-cost, and repeatable method for using an illumination device (110) to facilitate the alignment of two components (120, 160) during an assembly process. A laser mount positioning device (LMPD) (130) provides an apparatus for holding an illumination device (110) and positioning that illumination device such that the light beam (180) from the illumination device is passed through a guide pin hole (136). The light beam illuminates a guide pin (150) on another component when the two components are aligned properly. The LMPD (130) is installed in the guide pin hole in a preferred embodiment.

20 Claims, 4 Drawing Sheets

LASER MOUNT POSITIONING DEVICE AND METHOD OF USING SAME

FIELD OF THE INVENTION

The present invention relates generally to the joining of two components in an assembly process, and more particularly, to a method and apparatus to aid in alignment portions of the assembly process.

BACKGROUND OF THE INVENTION

Traditionally, large components such as communication satellites have been extremely expensive and time-consuming to develop and assemble. One reason is because satellite and satellite payload specifications generally lead to complex products which require a high degree of reliability. In particular, design parameters require a minimization of the structural mass of the satellite in order to maximize both orbit-maintaining fuel carried by the satellite and launch vehicle fuel. Minimization of structural mass causes satellites to become delicate and susceptible to damage through mishandling.

Satellite technology has become increasingly more important in commercial applications. These satellite applications frequently utilize an increased quantity of satellites. This has led to the use of launch vehicle dispenser areas which can hold a number of individual communication satellites and a dispensing mechanism. Technological advances have decreased satellite component sizes and masses leading to smaller physical sizes for satellites. Smaller satellites were desired to enable a launch vehicle dispenser area to hold multiple satellites and dispense them into orbit on a single launch.

To efficiently utilize expensive launch vehicle resources, satellites are preferably closely packed into a launch vehicle dispenser area. Minimal spacing between each of the delicate satellites is desirable for efficient packing. Traditional methods of hoisting and placing satellites into a payload area are highly susceptible to human error. The potential both for damage to already-loaded satellites and damage to a satellite currently being loaded is substantial. Also, down-time associated with replacing and re-manufacturing a replacement satellite would be extremely costly in a commercially competitive environment.

Some prior-art devices utilizing laser technology have been used in various construction or assembly applications to provide leveling and/or alignment assistance. Typically, prior-art devices which aid in alignment procedures during assembly are complex, costly, require adjustment, and must be attached to either or both components being assembled thus causing damage to the components and/or extra connection apparatuses (e.g., brackets and/or screws) which become superfluous after the assembly procedure is completed.

Thus, what is needed is an apparatus for aligning components and a method for using the apparatus during an assembly process which does not utilize costly, complex, and damaging devices. What is also needed is an apparatus capable of reducing or eliminating alignment errors in the loading and/or placement of satellites on a launch vehicle dispenser.

BRIEF DESCRIPTION OF THE DRAWINGS

A more complete understanding of the invention can be derived by referring to the detailed description and claims when considered in connection with the figures, wherein like reference numbers refer to similar items throughout the figures, and:

DETAILED DESCRIPTION OF A PREFERRED EMBODIMENT

The invention provides, among other things, a method and apparatus to facilitate in the alignment and joining of components during an assembly process. The method and apparatus of the present invention can be used to assemble components in an assembly line, for example. In addition, the method and apparatus of the present invention can be used to provide alignment during coupling of devices such as, for example, coupling a satellite to a launch vehicle dispenser. In one aspect, the invention provides a simple, accurate, low-cost, and repeatable method for using an illumination device to facilitate the alignment of at least two components during an assembly process. In accordance with a preferred embodiment, a laser mount positioning device (LMPD) provides an apparatus for holding the illumination device and positioning that illumination device such that the light beam from the illumination device can pass through a guide pin hole on a first component. The light beam illuminates a guide pin attached to a second component when the first and second components are aligned properly. The LMPD is installed in proximity to the guide pin hole (on the first component) through which the guide pin (on the second component) is inserted when the first and second components are coupled together. In a preferred embodiment, the LMPD is held in place using its own weight, thus eliminating the need for additional mounting hardware such as brackets and screws. This allows the LMPD to be easily moved from one location to another and reused.

Figure 1:
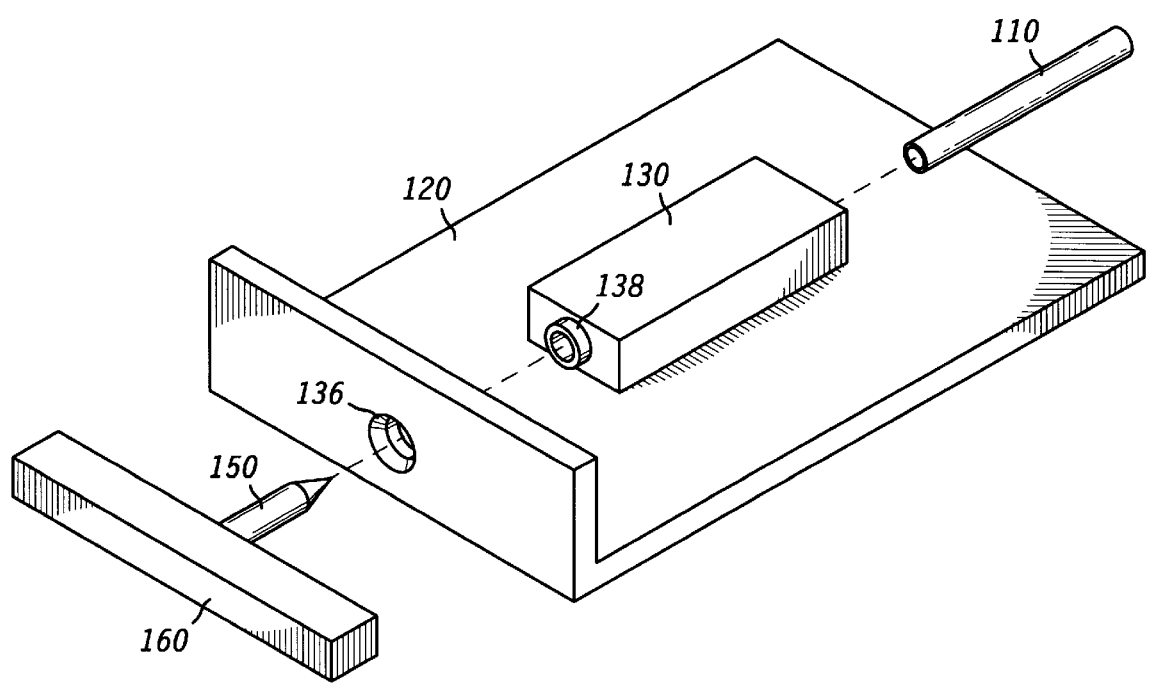
FIG. 1 shows a simplified exploded view of a laser mount positioning device (LMPD) oriented with respect to an illumination device, a first component, a second component, and a guide pin in accordance with a preferred embodiment of the invention.

FIG. 1 shows a simplified exploded view of an LMPD 130 oriented with respect to an illumination device 110, a first component 120, a second component 160, and a guide pin 150 in accordance with a preferred embodiment of the invention.

Desirably, illumination device 110 is a light source with a shaped beam, such as a laser light source. For example, the laser light source could be a pointing laser such as those used as presentation aids. In alternate embodiments, a number of different types of focused (i.e., shaped beam) light sources could be used.

First component 120 could be any device that is coupled to, integral with, or forms the entirety of a first device which is being aligned with a second device. For example, first component 120 could be a bracket on a satellite or other space vehicle. First component 120 comprises at least one guide pin hole 136, through which guide pin 150 is inserted during assembly of first component 120 and second component 160.

As will be described in detail in conjunction with FIGS. 2–4, in a preferred embodiment, LMPD 130 includes means for supporting illumination device 110. In a preferred embodiment, LMPD 130 also includes means for selfattachment to first component 120, although this is not required. In a preferred embodiment, LMPD 130 can be attached to first component 120 using a guide pin hole in first component 120, although this is not required for this invention. In alternate embodiments, a number of different attachment procedures could be used which may or may not include mounting brackets, friction pads, adhesive, or any other means.

In a typical application, guide pin 150 could be integral with or permanently attached to second component 160. In other applications, guide pin 150 could be removable after the first and second components are mated together. For example, guide pin 150 could be replaced by a piece of mounting hardware, such as a bolt.

The method and apparatus of the present invention are applicable to assembly operations of large devices, such as those in which a crane is used to align one component relative to another component. The invention is also applicable to other assembly operations which would benefit from a simple, low-cost method and apparatus for aligning components using at least one guide pin and associated guide pin hole.

In a preferred embodiment, LMPD includes one illumination device holder. In alternate embodiments, LMPD could include more than one illumination device holder. In alternate embodiments, the illumination device holders could also be different. In these cases, different types of illumination devices could be used.

Functionally, the LMPD is used as follows in a preferred embodiment to assist in the alignment of components. First, illumination device 110 is inserted into the LMPD's illumination device holder. In an alternate embodiment, an illumination device could be included as an integral part of the LMPD or could be semi-permanently or permanently attached on or within the LMPD.

In a preferred embodiment, the LMPD 130, with illumination device 110 attached or inserted, is placed in proximity to guide pin hole 136 of first component 120 so that light from illumination device 110 passes through the guide pin hole 136, thereby illuminating guide pin 150 associated with second component when the first and second component are aligned. First component 120, or second component 160, or both components are then moved toward each other so that guide pin 150 is inserted into guide pin hole 136.

In a preferred embodiment, the end of the LMPD which first encounters guide pin 150 is shaped to conform to a first part (i.e., the tip) of guide pin 150. Guide pin 150 engages with LMPD 130 and displaces LMPD 130 as guide pin 150 becomes fully inserted into guide pin hole 136. After insertion, LMPD 130 can be removed from the end of guide pin 150.

In a preferred embodiment, LMPD 130 includes at least one attachment means for detachably coupling the LMPD to first component 120. In a preferred embodiment, the attachment means is a shaped projection 138 which is formed on one end of LMPD 130. In a preferred embodiment, projection 138 is shaped to conform to the shape of guide pin hole 136, and LMPD 130 is attached to first component 120 by placing LMPD 130 on first component 120 such that shaped projection 138 fits into guide pin hole 136.

In a preferred embodiment, guide pin hole 136 is round and shaped projection 138 is cylindrical. Shaped projection 138 could be inserted into guide pin hole 136 (i.e., where the radius of shaped projection 138 is less than or equal to the radius of guide pin hole 136) or could be inserted into a bored-out ring on the end of guide pin hole 136 into which shaped projection 138 fits (i.e., where the radius of shaped projection 138 is greater than the radius of guide pin hole 136). Once inserted into guide pin hole 136, LMPD 130 is detachably connected to first component 120 and LMPD 130 is oriented relative to guide pin hole 136. In alternate embodiments, the guide pin hole could be rectangular, elliptical, triangular, or have some other geometric shape. In such embodiments, the shaped projection would desirably be created to match the shape of the guide pin hole.

In other alternate embodiments, mounting hardware (e.g., bracket(s) and/or screw(s) or other structure), friction pads, adhesive, or other means could be used to attach the LMPD to the first component. In still other alternate embodiments, the LMPD could be held in place by gravity, magnetically, or by other phenomenon.

In a preferred embodiment, an LMPD is manufactured using at least one plastic material. Desirably, the plastic material is rigid and transparent, although this is not required for this invention. The use of a transparent material enables the light beam and orientation of the guide pin, guide pin hole, and LMPD to be viewed during engagement. In alternate embodiments, an LMPD could be fabricated using any number of different materials such as various metals. In these cases, the material could be non-transparent.

In a preferred embodiment, an LMPD has a substantially rectangular shape, although this is not required for this invention. In alternate embodiments, the LMPD could have a substantially cylindrical shape or any other shape.

Figure 2:
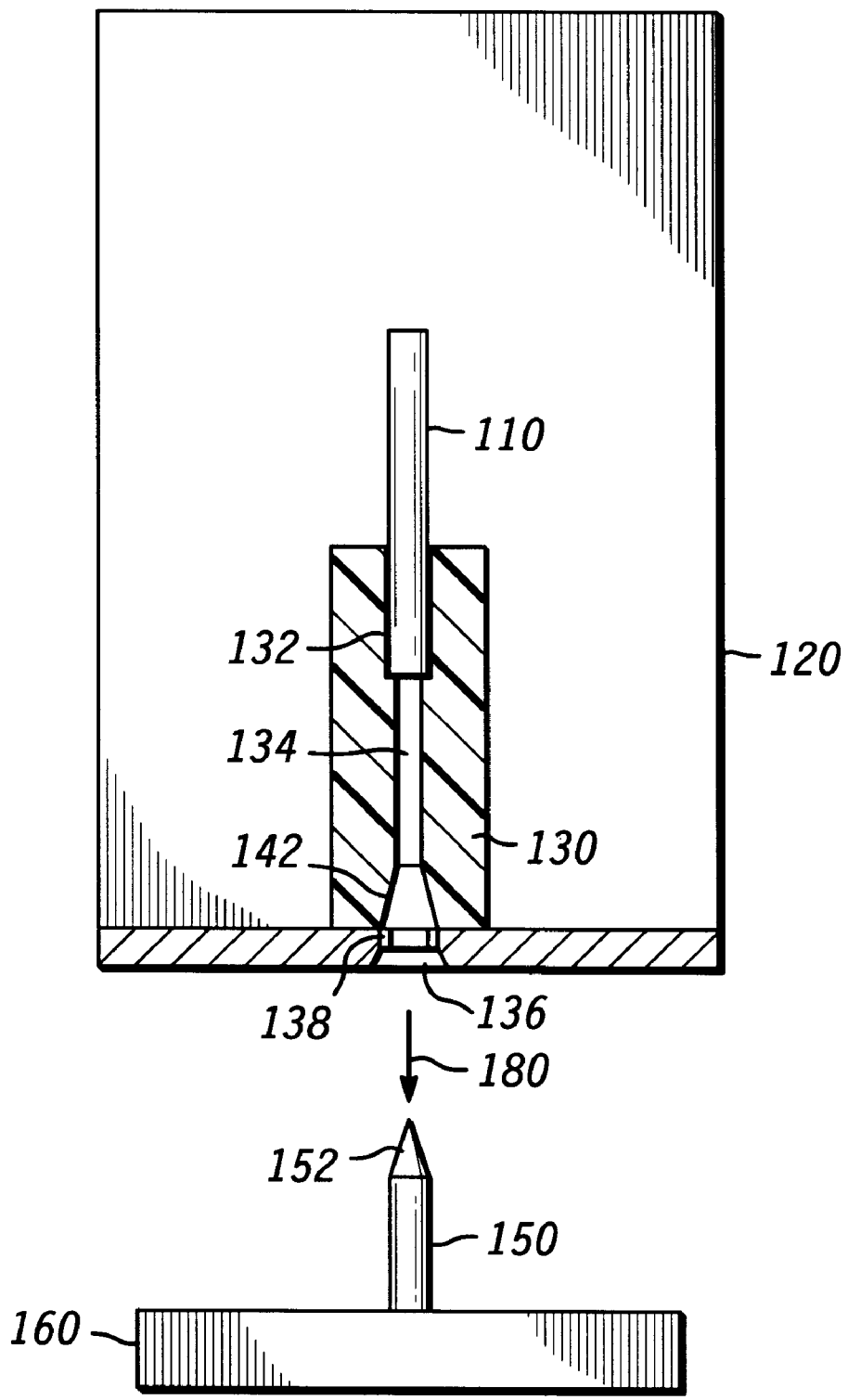
FIG. 2 illustrates a first cross-sectional view of an orientation of an LMPD, a first component, a guide pin, and a second component in accordance with a preferred embodiment of the invention.
Figure 3:
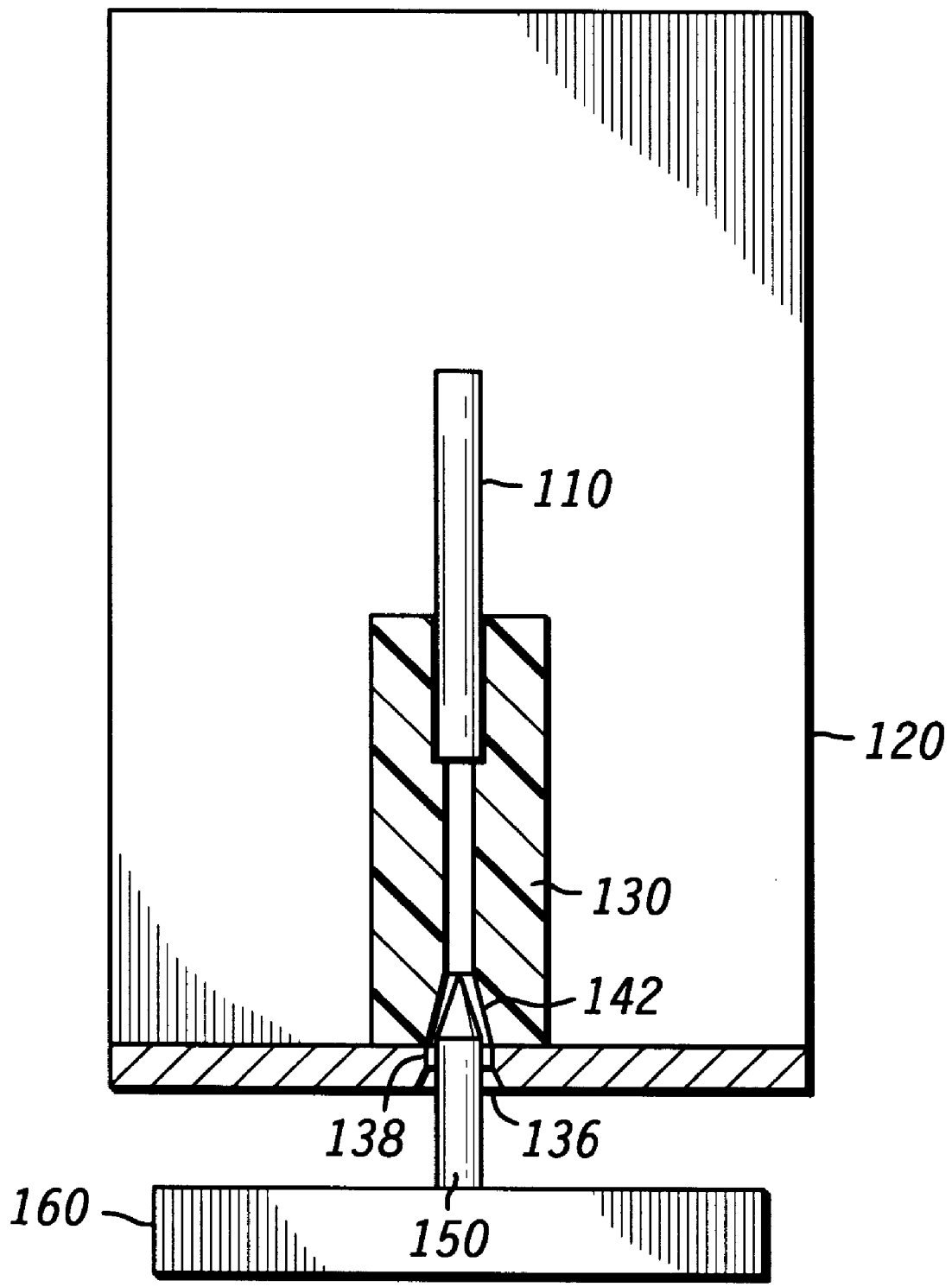
FIG. 3 illustrates a second cross-sectional view of an orientation of an LMPD, a first component, a guide pin, and a second component in accordance with a preferred embodiment of the invention.
Figure 4:
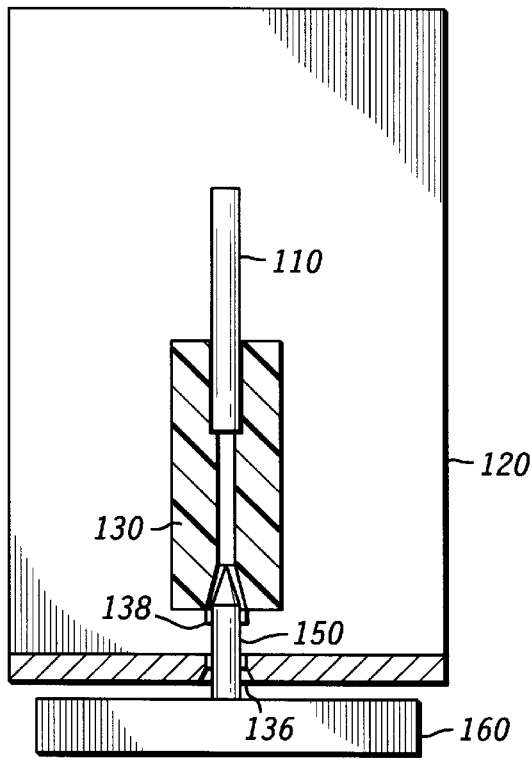
FIG. 4 illustrates a third cross-sectional view of an orientation of an LMPD, a first component, a guide pin, and a second component in accordance with a preferred embodiment of the invention.

FIGS. 2–4 illustrate orientations of an LMPD, a first component, a guide pin, and a second component prior to (FIG. 2), during (FIG. 3), and after (FIG. 4) engagement of the guide pin with the guide pin hole.

FIG. 2 illustrates a first cross-sectional view of an orientation of an LMPD, a first component, a guide pin, and a second component in accordance with a preferred embodiment of the invention. Illumination device holder 132, light passage 134, and counter bore 142 are shown on the cut-away view of LMPD 130.

In a preferred embodiment, illumination device holder 132 is a generally cylindrical channel in LMPD 130 which is used to hold illumination device 110 rigidly in place. Typically, the shape of the illumination device holder 132 conforms to the shape of the illumination device, although this is not necessary for this invention. In alternate embodiments, a number of different attachment methods could be used to secure illumination device 110 to LMPD 130.

In a preferred embodiment, light passage 134 is a cylindrical channel between illumination device holder 132 and counter bore 142 which allows light from illumination device 110 to pass through LMPD 130. Typically, light passage 134 is centered with respect to illumination device holder 112. In an alternate embodiment, a material or combination of materials which allow light to pass through to counter bore 142 could be used in place of light passage 134.

In a preferred embodiment, counter bore 142 is shaped to conform (in general) to the shape of the tip 152 of guide pin 150. In a preferred embodiment, shaped projection 138 is used to attach LMPD 130 to first component 120.

Light beam 180 is also shown in FIG. 2. Light beam 180 is desirably a shaped beam emanating from illumination device 110. In a preferred embodiment, light beam 180 comprises laser light which is used to illuminate first portion (e.g., tip 152) of guide pin 150 during an assembly process. FIG. 2 illustrates one guide pin 150 for clarity and ease of understanding, and this is not intended to limit the scope of the invention. More or fewer guide pins 150 and associated LMPDs 130 can be used.

FIG. 3 illustrates a second cross-sectional view of an orientation of an LMPD, a first component, a guide pin, and a second component in accordance with a preferred embodiment of the invention. FIG. 3 illustrates an exemplary view during the guide pin engagement portion of the assembly process. In this case, first component 120 has been brought toward (e.g., lowered onto) guide pin 150 which is attached to second component 160. Guide pin 150 is shown being inserted through guide pin hole 136 and into counter bore 142. In alternate embodiments, first component 120 and second component 160 can be moved together or separately. In addition, first component 120 and second component can move together vertically, horizontally, or at any other angular orientation.

FIG. 4 illustrates a third cross-sectional view of an orientation of an LMPD, a first component, a guide pin, and a second component in accordance with a preferred embodiment of the invention. FIG. 4 illustrates an exemplary view during an LMPD after displacement during the assembly process. As guide pin 150 pushes through guide pin hole 136, it forces shaped projection 138 to detach from guide pin hole 136 and LMPD is pushed upward with respect to first component 120. In an alternate embodiment, LMPD 130 could not be displaced during the assembly process. For example, in one alternate embodiment, a clearance region could be provided in LMPD 130 for receiving the entire guide pin 150.

In a preferred embodiment, LMPD 130 could be removed at any time after the alignment part of the assembly process has taken place and could be reused. LMPD 130 could be removed manually or automatically (e.g., using robots).

Figure 5:
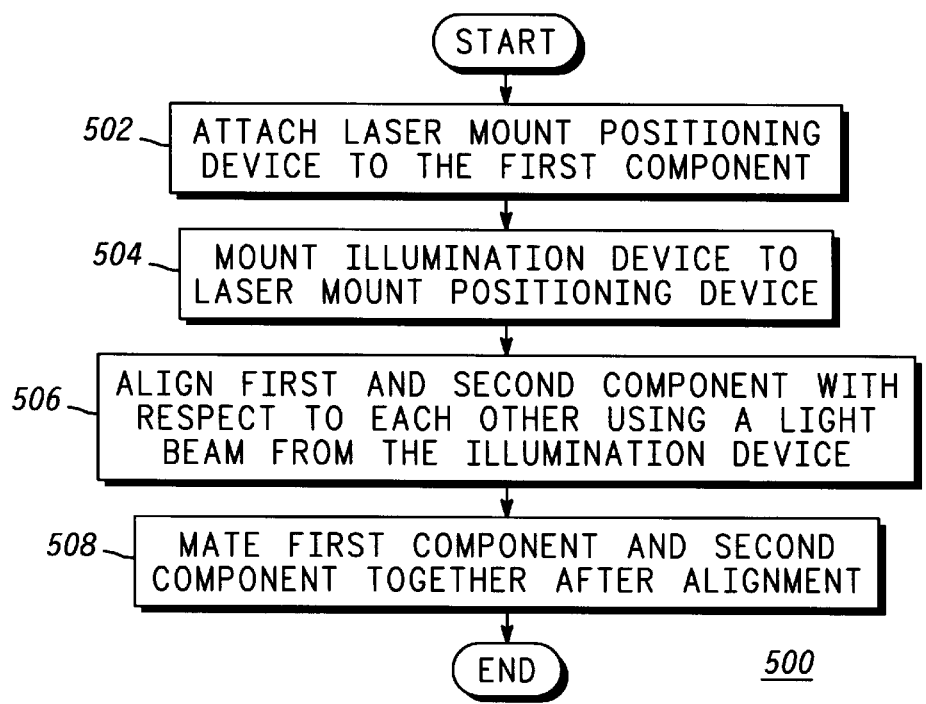
FIG. 5 illustrates a method of using an LMPD in an assembly process in accordance with a preferred embodiment of the invention.

FIG. 5 illustrates a method of using an LMPD in an assembly process in accordance with a preferred embodiment of the invention. Procedure 500 describes a method of using an LMPD in an assembly process in which two components are mated together. In this assembly process, at least one guide pin and at least one guide pin hole are used for aligning the two components.

In step 502, the LMPD is detachably coupled to the first component. In a preferred embodiment, a guide pin hole in the first component is used in the coupling process.

In step 504, an illumination device is mounted into the LMPD. A light beam from the illumination device is then able to pass through the LMPD and the guide pin hole. Desirably, the light beam is centered within the guide pin hole.

In step 506, the first component and a second component are aligned with respect to each other using the light beam to illuminate a guide pin on the second component. In this case, the light beam acts like a guide pin extender which makes the alignment process easier and more accurate.

In step 508, the first component is mated with the second component by positioning the two components such that the guide pin on the second component fits into the guide pin hole on the first component. Desirably, the guide pin movement can be monitored during the mating process. In this case, the LMPD is manufactured from a transparent material, and this allows the relative orientation of the guide pin hole and guide pin movement to be observed during the mating process.

In a preferred embodiment, as the guide pin is fully inserted through the guide pin hole, the LMPD detaches from the first component and is displaced. The LMPD then could be removed from the tip of the guide pin and reused. The procedure then ends.

In another embodiment, a second LMPD can be attached to the first component. Typically, a second guide pin hole in the first component is used for attaching the second LMPD. In addition, a second illumination device can be mounted to the second LMPD. In this case, a second light beam from the second illumination device passes through the second guide pin hole. Now, the first component and the second component can be aligned using the two light beams. In this case, one light beam is used to illuminate one guide pin on the second component and a second light beam is used to illuminate a second guide pin on the second component. In this way, rotational alignment is achieved between the first component and the second component. More than two guide pins, guide pin holes, and LMPDs could be used in other embodiments. All guide pins could be attached to the same component, or some could be attached to different components.

In summary, the LMPD and method for its use described herein provides a simple, accurate, low-cost, and reusable mounting apparatus and method using a light source. Desirably, an LMPD mounts in a guide pin hole used and is used to eliminate the alignment problems associated with assembly components with guide pins.

An LMPD can easily be manufactured using a small number of simple steps. For example, an illumination device holder can be machined into a block of material. In a preferred embodiment, this is accomplished by drilling a void into the block which has approximately the same diameter as the illumination device which is to be inserted into the holder. Next, a guide pin receiving means and light channel are machined into the block. Typically, the guide pin receiving means is shaped to conform to the shape of the tip of the guide pin which it will receive. Finally, a shaped projection is machined into the block.

The LMPD of the apparatus of the present invention provides a repeatable mounting method that requires no complicated alignment to be made or maintained between the LMPD and the first component. In a preferred embodiment, the LMPD is light weight and can be installed manually. The LMPD is simple to use and reduces the time required for an assembly process. The LMPD can easily be moved from one location to another facilitating reuse. In a preferred embodiment, theLMPD also does not impede the visualization of the guide pin during the assembly operation.

The invention provides a simple, accurate, low-cost, and repeatable method for using an illumination device to facilitate the alignment of two components during an assembly process. The LMPD provides an apparatus for holding an illumination device and positioning that illumination device such that the light beam from the illumination device is passed through a guide pin hole. The light beam illuminates a guide pin on another component when the two components are aligned properly.

The invention has been described above with reference to a preferred embodiment. However, those skilled in the art will recognize that changes and modifications can be made in this preferred embodiment without departing from the scope of the invention. For example, the procedures and steps identified herein can be categorized and organized differently than described herein while achieving equivalent results.

What is claimed is:

1. A laser mount positioning device (LMPD) for supporting and positioning an illumination device used for aligning a first component having a guide pin hole and a second component having a guide pin during an assembly process in which said guide pin is inserted into said guide pin hole, said LMPD comprising:

a block of material including at least one attachment means comprising a shaped projection formed at a first end of said block of material;

at least one illumination device holder comprising a cylindrical channel within said block of material for supporting and positioning said illumination device; and a guide pin receiving means comprising a counter bore centrally located in said at least one attachment means, said guide pin receiving means being coupled to said at least one illumination device holder, and being oriented with respect to said at least one illumination device holder, such that when said LMPD is coupled to said first component, and when said illumination device is inserted in said at least one illumination device holder, a light beam from said illumination device is allowed to pass through said guide pin receiving means, through said at least one attachment means, and through said guide pin hole of said first component, said light beam thereby illuminating said guide pin on said second component when said first component and said second component are aligned.

2. The LMPD as claimed in claim 1, wherein said LMPD further comprises at least one illumination device.

3. The LMPD as claimed in claim 2, wherein said at least one illumination device comprises a shaped beam light source.

4. The LMPD as claimed in claim 2, wherein said at least one illumination device comprises at least one laser light pointing device.

5. The LMPD as claimed in claim 1, wherein said at least one illumination device holder is created using a machining process.

6. The LMPD as claimed in claim 1, wherein said shaped projection is shaped to conform to said guide pin hole and to allow said block of material to be detachably coupled to said first component.

7. The LMPD as claimed in claim 6, wherein said shaped projection is cylindrically shaped.

8. The LMPD as claimed in claim 1, wherein said counter bore has a shape which conforms to the tip of said guide pin.

9. The LMPD as claimed in claim 1, wherein said LMPD further comprises at least one set of mounting hardware.

10. The LMPD as claimed in claim 1, wherein said block of material comprises at least one plastic material.

11. The LMPD as claimed in claim 1, wherein said block of material comprises at least one metallic material.

12. The LMPD as claimed in claim 1, wherein said LMPD further comprises a light passage for coupling said at least one illumination device holder to said guide pin receiving means.

13. The LMPD as claimed in claim 1, wherein said block of material has a substantially rectangular shape.

14. The LMPD as claimed in claim 1, wherein said block of material has a substantially cylindrical shape.

15. The LMPD as claimed in claim 1, wherein said block of material comprises at least one transparent material.

16. A method of using a laser mount positioning device (LMPD) in an assembly process wherein a first component having at least one guide pin hole and a second component having at least one guide pin are mated together and wherein said at least one guide pin and said at least one guide pin hole are used for aligning and mating said first and second components, said method comprising the steps of:

coupling said LMPD to said first component, said LMPD having an attachment means and said LMPD being detachably coupled to said first component by inserting said attachment means into a guide pin hole in said first component;

mounting an illumination device to said LMPD, said LMPD having an illumination device holder for holding said illumination device;

directing a light beam, being emitted from said illumination device, from said LMPD and through a center portion of said guide pin hole; and aligning said first component with said second component using said light beam, wherein correct alignment occurs when said light beam illuminates a tip of a guide pin on said second component.

17. The method as claimed in claim 16, further including a step of:

mounting said illumination device such that said light beam is centered in said guide pin hole.

18. The method as claimed in claim 16, wherein said method further comprises the step of:

maintaining said correct alignment while mating said first component with said second component, said mating occurring by positioning said two components closer to each other such that said tip of said guide pin on said second component is inserted into said guide pin hole on said first component and inserted into a guide pin receiving means of said LMPD, said guide pin receiving means being coupled to said attachment means.

19. The method as claimed in claim 18, wherein said method further comprises the step of:

continuing said mating process by positioning said two components closer together until said guide pin is inserted into said guide pin hole and said LMPD is uncoupled from said first component, wherein said LMPD is uncoupled from s aid first component by said guide pin forcing said attachment means out of said guide pin hole as said two components are moved closer together.

20. The method as claimed in claim 16, said method further comprising the steps of:

coupling a second LMPD to said first component, wherein a second guide pin hole of said at least one guide pin hole is used for said coupling and said second LMDP comprising a laser light source, so that a second light beam being emitted from said second LMPD passes through a center portion of said second guide pin hole; and aligning said first component with said second component using said light beam to illuminate said guide pin on said second component and using said second light beam to illuminate a second guide pin on said second component.

* * * * *